(12) United States Patent
Bruckner et al.

(10) Patent No.: US 10,062,900 B2
(45) Date of Patent: Aug. 28, 2018

(54) CATHODE FOR LITHIUM-CONTAINING BATTERIES AND SOLVENT-FREE METHOD FOR THE PRODUCTION THEREOF

(71) Applicant: Fraunhofer-Gesellschaft zur Forderung der angewandten Forschung e.V., Munich (DE)

(72) Inventors: Jan Bruckner, Dresden (DE); Sebastian Tschocke, Dresden (DE); Holger Althues, Dresden (DE); Stefan Kaskel, Dresden (DE); Soren Thieme, Dresden (DE)

(73) Assignee: FRAUNHOFER-GESELLSCHAFT ZUR FORDERUNG DER ANGEWANDTEN FORSCHUNG E.V (DE)

(*) Notice: Subject to any disclaimer, the term of this patent is extended or adjusted under 35 U.S.C. 154(b) by 650 days.

(21) Appl. No.: 14/380,501

(22) PCT Filed: Feb. 21, 2013

(86) PCT No.: PCT/EP2013/053438
§ 371 (c)(1),
(2) Date: Aug. 22, 2014

(87) PCT Pub. No.: WO2013/127684
PCT Pub. Date: Sep. 6, 2013

(65) Prior Publication Data
US 2015/0061176 A1 Mar. 5, 2015

(30) Foreign Application Priority Data
Feb. 28, 2012 (DE) .................. 10 2012 203 019

(51) Int. Cl.
*H01M 4/131* (2010.01)
*H01M 4/04* (2006.01)
(Continued)

(52) U.S. Cl.
CPC ......... *H01M 4/131* (2013.01); *H01M 4/0402* (2013.01); *H01M 4/043* (2013.01);
(Continued)

(58) Field of Classification Search
CPC ..................................... H01M 4/131
See application file for complete search history.

(56) References Cited

U.S. PATENT DOCUMENTS

2003/0205835 A1 11/2003 Eastin
2006/0246343 A1* 11/2006 Mitchell ............... H01G 11/38
429/121
(Continued)

FOREIGN PATENT DOCUMENTS

CN 101194384 A 6/2006
DE 69520426 T2 10/2001
(Continued)

OTHER PUBLICATIONS

Chinese Office Action dated Dec. 2, 2015.
(Continued)

*Primary Examiner* — Larry Thrower
(74) *Attorney, Agent, or Firm* — Tarolli, Sundheim, Covell & Tummino LLP

(57) ABSTRACT

The present invention relates to a process for producing a cathode foil of a lithium-containing battery, comprising:
(i) provision of a dry, solvent-free composition which comprises polytetrafluoroethylene, an electrically conductive, electrochemically inactive carbon material and an electrochemically active cathode material,
(ii) formation of at least partially fibrillated polytetrafluoroethylene by action of shear forces on the dry, solvent-free composition to give a fibrillated composition,
(iii) forming of the fibrillated composition to give a cathode foil.

10 Claims, 4 Drawing Sheets

(51) Int. Cl.
  *H01M 4/139* (2010.01)
  *H01M 4/62* (2006.01)
  *H01M 4/133* (2010.01)
  *H01M 10/0525* (2010.01)
  *H01M 10/052* (2010.01)

(52) U.S. Cl.
  CPC ......... *H01M 4/0411* (2013.01); *H01M 4/133* (2013.01); *H01M 4/139* (2013.01); *H01M 4/623* (2013.01); *H01M 10/0525* (2013.01); *H01M 10/052* (2013.01)

(56) References Cited

U.S. PATENT DOCUMENTS

| | | | |
|---|---|---|---|
| 2007/0008677 A1* | 1/2007 | Zhong | H01G 9/058 361/502 |
| 2007/0287060 A1 | 12/2007 | Naoi et al. | |
| 2008/0201925 A1* | 8/2008 | Zhong, II | H01G 11/38 29/25.03 |

FOREIGN PATENT DOCUMENTS

| | | |
|---|---|---|
| EP | 2306563 A1 | 4/2011 |
| JP | 63-72065 A | 4/1988 |
| JP | 07-254432 | 3/1995 |
| JP | 2001-307727 A | 11/2001 |
| JP | 2008-541339 A | 11/2008 |
| KR | 2007-0057175 A | 6/2007 |
| WO | 2006/135495 A1 | 12/2006 |
| WO | 2010008058 A1 | 1/2012 |

OTHER PUBLICATIONS

Notice of Grounds for Rejection for the Korean Patent Application No. 2014-7026663 dated Nov. 20, 2015.
Notice of Grounds for Rejection for Korean Patent Application No. 2014-7026663, dated Nov. 28, 2016.
First Japanses Office Action dated Sep. 14, 2015, English Translation.
First German Office Action dated Oct. 11, 2012.

* cited by examiner

CATHODE FOR LITHIUM-CONTAINING BATTERIES AND SOLVENT-FREE METHOD FOR THE PRODUCTION THEREOF

Electrodes (anodes and cathodes) for Li ion cells are produced predominantly by means of paste or slip coating processes. The active materials in powder form are converted into a slip by addition of a solvent (generally N-methylpyrrolidone), a binder and further additives. This can be applied to metal foils by various application methods such as doctor blade coating or via nozzles.

For new battery technologies such as lithium-sulphur systems, too, recourse is generally made to this established process. The processing of the starting components via pastes and slips on the basis of aqueous or organic solvents is known. Accordingly, these pastes or slurries are applied to current collectors by means of a doctor blade or spraying techniques. Disadvantages of these processes are the use of a toxic, expensive and high-boiling organic solvent, a complicated dispersion step and a complicated drying process. When aqueous solutions are used, drying is particularly important since water residues in a secondary lithium battery could react vigorously with the electrolyte salt and/or the active materials to form explosive (and toxic) gases. It also has to be taken into account that high temperatures during drying could bring about sublimation of sulphur (i.e. the electrochemically active cathode material).

For the industrial production of electrode foils, production costs, reproducibility and constancy of the production process are of particular importance. Very high casting rates, short drying times and a low susceptibility of the slip or of the casting method to fluctuations in the ambient atmosphere (e.g. temperature, moisture) are required. To cover the envisaged requirements of battery manufacturers, very high advance rates of above 10 m/min are indispensable in order to increase the productivity. Long drying distances of more than 15 m are thus necessary.

There is therefore of interest to develop a production process for electrodes of Li ion cells which do without the use of solvents and nevertheless leads to electrodes having high capacity values.

Such a solvent-free process would allow drastic savings to be achieved as a result of reduced capital costs (plants, dryer sections), improved energy, safety and environmental aspects, higher process speeds, reduced number of process steps and also disappearance of solvent costs.

In view of what has been said above, it is an object of the present invention to provide a solvent-free process for producing a cathode of a lithium-containing battery, e.g. a lithium-sulphur battery or lithium ion battery. However, the improved efficiency of the production process should not be achieved at the expense of the performance of the cathode unit. A further object of the present invention is to provide a cathode of a lithium-containing battery, which can be obtained by means of such an efficient production process and nevertheless has good performance.

Figure 1:
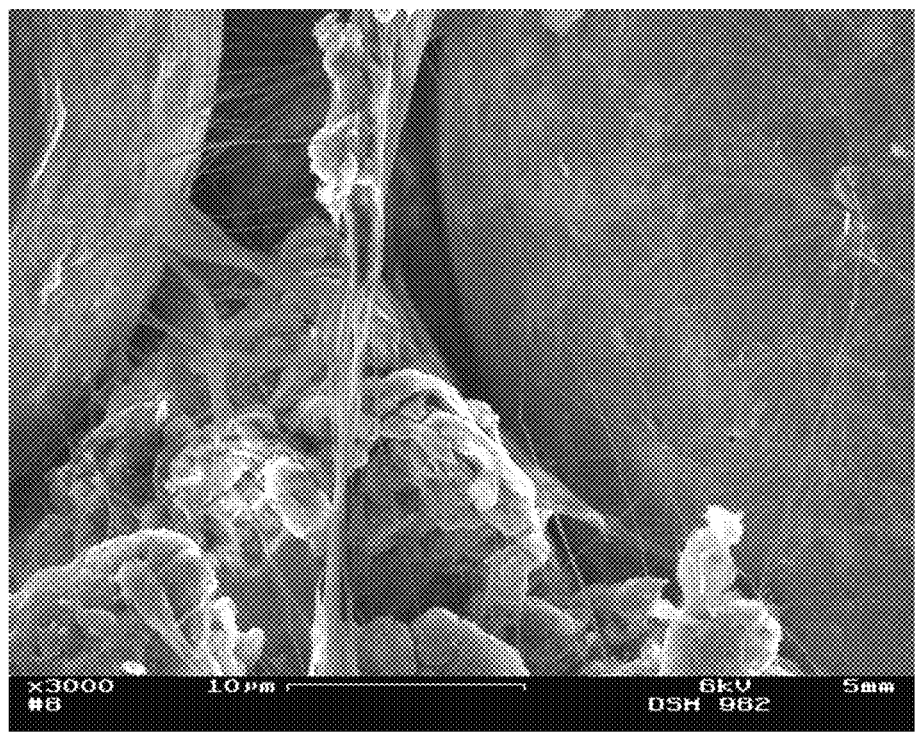
FIG. 1 shows a scanning electron micrograph of a composition comprising fibrillated polytetrafluoroethylene.

According to a first aspect of the present invention, the object is achieved by a process for producing a cathode foil of a lithium-containing battery, comprising:
(i) provision of a dry, solvent-free composition which comprises polytetrafluoroethylene, an electrically conductive, electrochemically inactive carbon material and an electrochemically active cathode material,
(ii) formation of at least partially fibrillated polytetrafluoroethylene by action of shear forces on the dry, solvent-free composition to give a fibrillated composition,
(iii) forming of the fibrillated composition to give a cathode foil.

A complicated drying step for the cathode foil is no longer necessary in the case of the process of the invention. As described in more detail below, this efficient process also leads to a high-performance cathode in lithium-containing batteries, e.g. lithium-sulphur batteries or lithium ion batteries.

The lithium-containing battery is preferably a lithium-sulphur battery or a lithium ion battery.

With regard to the polytetrafluoroethylene to be used in step (i), it is important that this can form fibrils under the action of shear forces. This phenomenon and polytetrafluoroethylene suitable for this purpose are known in principle to those skilled in the art. For example, a polytetrafluoroethylene prepared by emulsion polymerization and having a high molecular weight may be mentioned at this point.

Pulverulent or granulated polytetrafluoroethylene can be used for the provision of the dry, solvent-free composition in step (i).

As an alternative, a polytetrafluoroethylene suspension can be used for provision of the dry, solvent-free composition in step (i). The PTFE suspension and the electrically conductive, electrochemically inactive carbon material can be mixed with one another and the liquid suspension medium can subsequently be removed.

The electrically conductive, electrochemically inactive carbon material is preferably selected from among carbon black, porous carbons, carbon nanotubes, graphene, graphite, carbon fibres and mixtures thereof.

Suitable carbon black materials as conductivity additives (e.g. as "conductive carbon black") are known in principle to those skilled in the art.

For the purposes of the present invention, the term "carbon nanotubes" has its usual meaning familiar to those skilled in the art and refers to microscopically small tubular structures made of carbon, which can be in the form of a rolled-up graphene layer (single-walled) or a plurality of concentric tubes composed of rolled-up graphene layers (multiwalled).

The length of the carbon nanotubes can vary over a wide range. A suitable length in this context can be, for example, in the range from 0.1 μm to 1000 μm or else from 0.1 μm to 100 μm.

The diameter of the nanotubes can, for example, be in the range of 0.1-100 nm, more preferably 1-50 nm, particularly preferably 5-20 nm.

For the purposes of the present invention, the term "graphene" has its usual meaning familiar to those skilled in the art and refers to a modification of carbon having a two-dimensional structure in which each carbon atom is surrounded by three further carbon atoms so as to form a honeycomb-like pattern. Graphene can, for example, be used in the form of graphene flocs.

The porous carbon is preferably selected from activated carbon (e.g. spherical carbon), a carbon produced from carbide (known as "CDC": "carbide-derived carbon"), spherical hollow carbon and mixtures thereof. In the case of spherical hollow carbon, spherical hollow carbon produced with the assistance of a template or without a template is particularly suitable.

These porous carbons are known to those skilled in the art and are commercially available or can be produced by means of known standard processes.

If spherical carbon is introduced into the dry, solvent-free composition, it preferably has an average particle diameter of from 25 μm to 125 μm.

Suitable electrochemically active cathode materials for lithium-containing batteries are known in principle to those skilled in the art.

In a lithium-sulphur battery, the electrochemically active cathode material is sulphur or lithium sulphide ($Li_2S$) or a mixture thereof.

In the case of the lithium ion battery, mention may be made by way of example of the following electrochemically active cathode materials: lithium iron phosphate ($LiFePO4$), $LiCoO_2$, $LiNiO_2$, $LiNi_{1-x}Co_xO_2$, $LiNi_{0.85}Co_{0.1}Al_{0.05}O_2$, $LiNi_{0.33}Co_{0.33}Mn_{0.33}O_2$, $LiMn_2O_4$.

The polytetrafluoroethylene, the electrically conductive, electrochemically inactive carbon material and the electrochemically active cathode material are preferably blended or mixed with one another in step (i) to give the dry, solvent-free composition.

Intensive blending or mixing of the components, e.g. in a mill such as a ball mill or mortar mill or a calender, can take place as early as in the provision of the dry, solvent-free composition in step (i). However, this mixing preferably does not yet take place under conditions which bring about fibrillation of the polytetrafluoroethylene. As an alternative, the components can be only loosely blended with one another in step (i) and the intensive mixing is carried out in step (ii) under conditions which then also bring about the formation of polytetrafluoroethylene fibrils.

In a preferred embodiment, the electrically conductive, electrochemically inactive carbon material and the electrochemically active cathode material can be introduced as composite material and blended with the polytetrafluoroethylene in step (i) in order to obtain the dry, solvent-free composition.

A suitable composite material can, for example, be obtained by applying the active cathode material to the (internal or external) surface of the electrically conductive carbon material. As an alternative, it is also possible for the electrically conductive carbon material to be applied to the surface of the active cathode material, e.g. in the form of a coating on pulverulent or granulated cathode material.

To achieve better contact, it may be preferred to mix the electrically conductive, electrochemically inactive carbon material and the electrochemically active cathode material beforehand or to deposit the electrochemically active cathode material on the surface of the conductive carbon material (e.g. intrusion or infiltration) and subsequently to add the polytetrafluoroethylene in order to provide the dry, solvent-free composition in step (i).

For example, the electrochemically active cathode material such as the sulphur can be melted or brought into the gas phase and subsequently be brought into contact with the electrically conductive carbon material in order to deposit the electrochemically active component on the surface of the conductive carbon material. As an alternative, the electrochemically active component can be applied by means of a solvent to the conductive carbon material, with the solvent subsequently being removed again.

As indicated above, the formation of at least partially fibrillated polytetrafluoroethylene occurs in step (ii) by action of shear forces on the dry, solvent-free composition, as a result of which a fibrillated composition is obtained.

Suitable treatment steps for forming polytetrafluoroethylene fibrils are known in principle to those skilled in the art.

Figure 2:
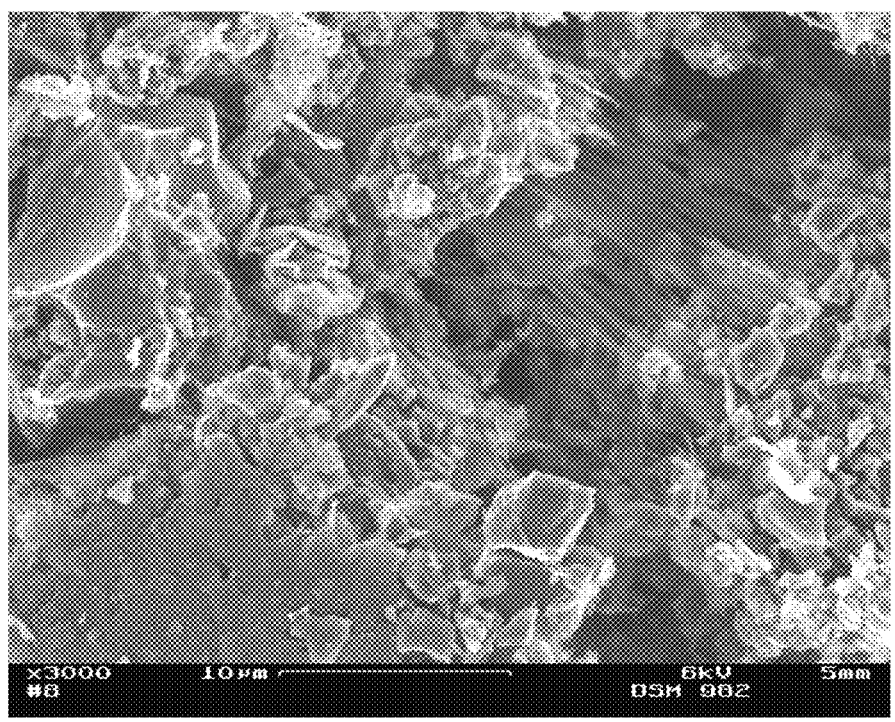
FIG. 2 shows a scanning electron micrograph of a composition comprising fibrillated polytetrafluoroethylene.

It can readily be seen from scanning electron micrographs whether fibrils have been formed as a result of the shear forces introduced. The fibrils can be readily seen as thin threads in the scanning electron micrograph. FIGS. 1 and 2 show a composition comprising fibrillated polytetrafluoroethylene.

For the purposes of the present invention, a fibrillated composition is a composition in which the polytetrafluoroethylene is present in at least partially fibrillated form (i.e. in the form of fibrils).

The formation of polytetrafluoroethylene fibrils in step (ii) is preferably achieved by means of a milling treatment. Conventional milling apparatuses such as ball mills or mortar mills can be used here.

The application of sufficient shear forces and the formation of PTFE fibrils can, for example, also be achieved by blending in a transport screw as is present, for example, in an extruder.

As indicated above, the fibrillated composition is formed to give a cathode foil in step (iii).

In order to convert the fibrillated composition into a foil, it is possible to use conventional forming techniques known to those skilled in the art.

In a preferred embodiment, forming of the fibrillated composition to give a foil in step (iii) is effected by rolling. This rolling out of the fibrillated composition can be carried out in a calender.

Forming can be carried out at room temperature or elevated temperature, e.g. 50-150° C. When forming takes place at room temperature, it can be advantageous for the composition to contain a solid having a spherical particle morphology, e.g. spherical carbon. Forming at elevated temperature (e.g. 50-150° C.) can in the case of rolling-out be effected, for example, by the rollers being heated.

In the rolling process, it is preferred that no great pressing pressure prevails, but rather a shear pressure prevails.

The forming of the fibrillated composition to give the cathode foil can, however, also be carried out via a pressing step (for example hot pressing) or extrusion. As explained in more detail below, such a pressing step can at the same time be used for applying the foil to a substrate.

To improve the processability in step (iii), suitable liquid or solid processing additives can be added to the fibrillated composition. The amount of these additives, based on the total mass of the composition, is preferably less than 20% by weight, more preferably less than 10% by weight or even less than 5% by weight. However, the process of the invention can also be carried out without addition of liquid or solid processing additives, in particular without liquid processing additives.

The proportion of polytetrafluoroethylene in the cathode foil can be varied over a wide range and is preferably in the range of from 2% by weight to 50% by weight, more preferably 3-20% by weight, even more preferably 5-10% by weight.

The electrochemically active cathode material is preferably present in the cathode foil in an amount of from 40% by weight to 90% by weight, more preferably 50-80% by weight.

In the case of a lithium ion battery, it can be preferred that the electrochemically active cathode material is present in the cathode foil in an amount of from 40% by weight to 85% by weight, more preferably from 60-80% by weight.

In the case of a lithium-sulphur battery, it can be preferred that the electrochemically active cathode material is present in the cathode foil in an amount of from 40% by weight to 90% by weight, more preferably 50-70% by weight.

The cathode foil produced by the process of the invention preferably has a thickness in the range of from 20-1000 μm, more preferably in the range of from 50-500 μm, particularly preferably 80-300 nm.

In a preferred embodiment, the cathode foil obtained by the process of the invention is self-supporting or free-standing. The self-supporting cathode foil can, owing to its good mechanical strength and its high flexibility, be used directly in the lithium-containing battery and does not have to be additionally applied to a conductive substrate. In a preferred embodiment, the cathode foil obtained in step (iii) is therefore not additionally applied to a conductive substrate such as a metal substrate or carbon substrate.

As an alternative, however, it can also be preferred that the cathode foil is applied to an electrically conductive substrate, preferably a metal substrate or a carbon substrate (e.g. composed of carbon fibres or a woven carbon fabric).

The application of the cathode foil to a substrate can be carried out during step (iii), i.e. during forming, for example by application of the fibrillated composition from step (ii) to a substrate and subsequent pressing to form the cathode foil on this substrate.

As an alternative, the free-standing or self-supporting cathode foil obtained in step (iii) can subsequently be applied to a substrate by suitable process steps known to those skilled in the art.

As suitable metal substrate, mention may be made by way of example of a metal foil, metal foam (e.g. nickel or aluminium metal foam), an expanded metal, a perforated metal or perforated plate, a woven metal mesh or a combination of these metallic structures. Here, a carbon coating can be used to reduce the contact resistance and to improve the adhesion.

According to a further aspect of the present invention, the object is alternatively achieved by a process for producing a cathode foil of a lithium-containing battery, comprising:
(i) provision of a dry, solvent-free composition which comprises polytetrafluoroethylene and an electrically conductive, electrochemically inactive carbon material,
(ii) formation of at least partially fibrillated polytetrafluoroethylene by action of shear forces on the dry, solvent-free composition to give a fibrillated composition,
(iii) forming of the fibrillated composition to give a foil, and
(iv) introduction of an electrochemically active cathode material into the foil to give a cathode foil.

In this alternative process variant, introduction of the electrochemically active cathode material (e.g. sulphur) is carried out only after a foil comprising fibrillated polytetrafluoroethylene and the electrically conductive, electrochemically inactive carbon material has been produced.

The introduction of electrochemically active cathode material such as sulphur into the foil obtained in step (iii) can, for example, be effected via the melt phase or gas phase. Here, the active cathode material diffuses into the foil to give a cathode foil.

With regard to the preferred properties of the polytetrafluoroethylene, of the electrically conductive, electrochemically inactive carbon material and of the electrochemically active cathode material, reference may be made to what has been said above.

With regard to the preferred features of the fibrillation step (ii) and the forming step (iii), too, reference may be made to what has been said above.

In the process of the invention, it is also possible for the electrochemically active cathode material to be introduced in step (i) and an additional introduction of the active cathode material to be carried out after step (iii).

According to a further aspect of the present invention, a cathode foil of a lithium-containing battery is provided, wherein this cathode foil comprises:
polytetrafluoroethylene which is at least partially fibrillated,
an electrically conductive, electrochemically inactive carbon material,
an electrochemically active cathode material.

With regard to the preferred properties of the polytetrafluoroethylene, the electrically conductive carbon material and the electrochemically active cathode material, reference may be made to what has been said above.

The cathode foil preferably contains the at least partially fibrillated polytetrafluoroethylene in an amount of from 2% by weight to 50% by weight, more preferably from 3% by weight to 20% by weight, particularly preferably from 5% by weight to 10% by weight.

The cathode foil preferably contains the electrically conductive carbon material in an amount of from 1% by weight to 55% by weight, more preferably from 5% by weight to 35% by weight.

The cathode foil preferably contains the electrochemically active cathode material in an amount of from 40% by weight to 90% by weight, more preferably from 50% by weight to 70% by weight.

In a preferred embodiment, the cathode foil is free-standing or self-supported, i.e. not applied to a conductive substrate, in particular not to a metal substrate.

Alternatively it can also be preferred that the cathode foil is applied to an electrically conductive substrate, preferably a metal substrate or carbon substrate. With regard to the preferred properties of this metal substrate or carbon substrate, reference may be made to what has been said above. In this case, the cathode foil and the substrate together form the cathode unit.

Preference is given to the cathode foil being produced by the above-described process or being able to be produced via this process.

According to a further aspect of the present invention, a lithium-containing battery which contains the above-described cathode foil is provided.

The lithium-containing battery is preferably a lithium-sulphur battery or a lithium ion battery. With regard to further details of these types of battery, reference may be made to what has been said above.

EXAMPLES

Example 1

The following dry, solvent-free starting composition was provided:
0.450 g of activated carbon (YP 50F, Kuraray Chemical Co., LTD) as porous, conductive carbon material,
0.450 g of sulphur as electrochemically active cathode material, 0.050 g of conductive carbon black (Super C65, TIMCAL Ltd. Group) as conductive carbon material, 0.050 g of polytetrafluoroethylene.

The above materials are introduced into a steel mortar mill (i e provision of the dry, solvent-free composition). Fibrillation of the polytetrafluoroethylene is brought about by milling for two minutes at a horizontal and vertical pressure of 20 kg. A fibrillated composition is obtained. This composition is rolled out to a thickness of 150 nm at 155° C. in a calender. A self-supporting or free-standing cathode foil is obtained.

The good mechanical properties of this self-supporting foil are indicated, inter alia, by the fact that it can be rolled up and allows horizontal tensile forces to be applied. Vertical compressive forces (e.g. during cell construction) do not bring about any change in the foil. Furthermore, pieces can be stamped from the foil.

Example 2

The following dry, solvent-free starting composition was provided:

0.300 g of spherical carbon (TV 505, Blticher Adsor-Tech GmbH) as porous, conductive carbon material, 0.600 g of sulphur as electrochemically active cathode material, 0.050 g of conductive carbon black (SuperC65, TIMCAL Ltd. Group) as conductive carbon material, 0.050 g of polytetrafluoroethylene.

The production of a self-supporting cathode foil having a thickness of 150 nm was carried out in a manner analogous to the process steps described in Example 1.

Example 3

The following dry, solvent-free starting composition was provided:

0.250 g of spherical carbon (TV 505, Blticher Adsor-Tech GmbH) as porous, conductive carbon material, 0.500 g of sulphur as electrochemically active cathode material, 0.200 g of carbon nanotubes (NC7000, Nanocyl) as conductive carbon material, 0.050 g of polytetrafluoroethylene.

The production of a self-supporting cathode foil having a thickness of 150 nm was carried out in a manner analogous to the process steps described in Example 1.

Figure 3:
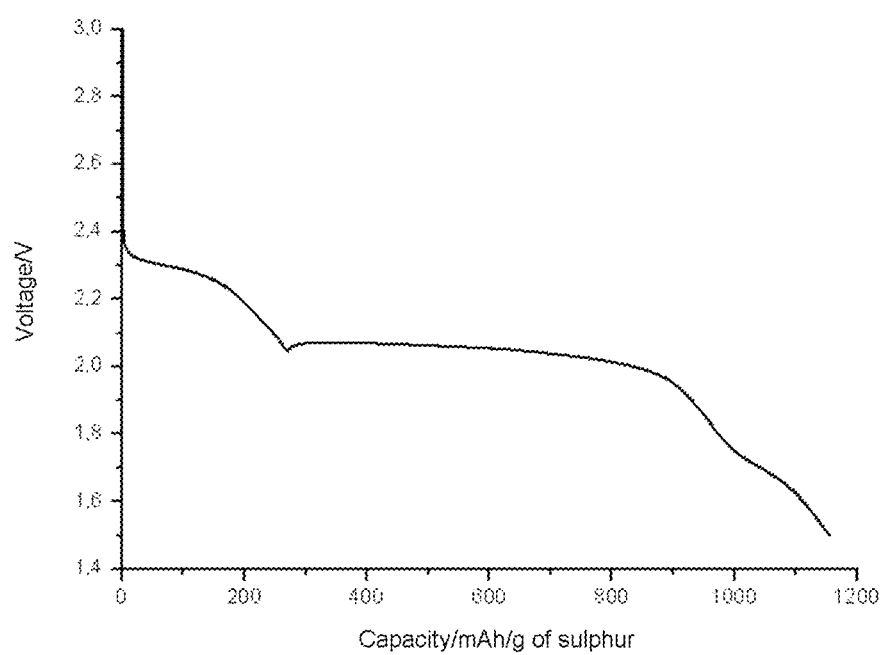
FIG. 3 is a graph of a discharge curve for the first cycle of a lithium-sulphur battery using the self-supporting cathode foil of Example 3.

Using the self-supporting cathode foil produced in Example 3, the discharge curve of the first cycle in a lithium-sulphur battery was determined. This is shown in FIG. 3. A high discharge capacity value of 1150 mAh/g of sulphur was able to be determined. This corresponds approximately to the values achieved in the prior art for lithium-sulphur batteries, see, for example, U.S. Pat. No. 6,569,573.

Example 4

The following dry, solvent-free starting composition was provided:

0.150 g of conductive carbon black (SuperC65, TIMCAL Ltd. Group) as conductive carbon material, 0.800 g of LiFePO$_4$ (P2, Phostech Lithium Inc.) as electrochemically active cathode material, 0.050 g of polytetrafluoroethylene.

The production of a self-supporting cathode foil having a thickness of 150 µm was carried out in a manner analogous to the process steps described in Example 1.

Figure 4:
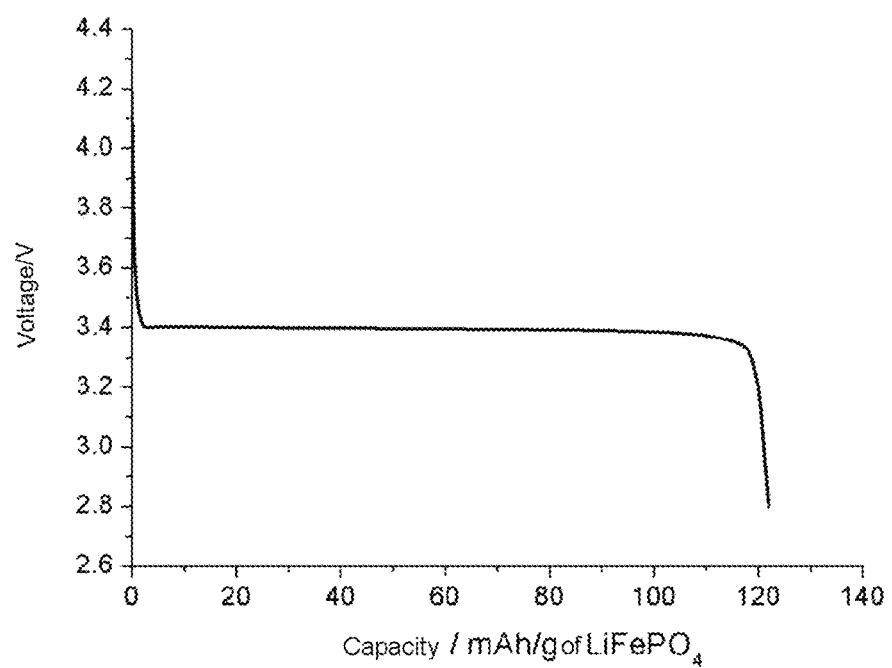
FIG. 4 is a graph of a discharge curve for the LiFePO$_4$ battery of Example 4.

Using the self-supporting cathode foil produced in Example 4, the voltage was determined as a function of the capacity (mAh/g of LiFePO$_4$) in an LiFePO$_4$ battery. This is shown in FIG. 4.

The invention claimed is:

1. A process for producing a cathode foil of a lithium-containing battery, comprising:
   (i) providing a dry, solvent-free composition which comprises polytetrafluoroethylene, an electrically conductive, electrochemically inactive carbon material, and an electrochemically active cathode material,
   (ii) forming at least partially fibrillated polytetrafluoroethylene by action of shear forces on the dry, solvent-free composition to give a fibrillated composition, and
   (iii) forming of the fibrillated composition to give a cathode foil;
   wherein the lithium-containing battery is a lithium-sulfur battery and the electrochemically active cathode material is present in the cathode foil in an amount of from 40% by weight to 90% by weight.

2. The process according to claim 1, wherein the forming of the fibrillated composition to give a cathode foil includes:
   (a) forming of the fibrillated composition to give a foil, and
   (b) introducing an electrochemically active cathode material into the foil to give the cathode foil.

3. The process according to claim 1, wherein the polytetrafluoroethylene, the electrically conductive, electrochemically inactive carbon material and the electrochemically active cathode material are blended with one another in step (i) to give the dry, solvent-free composition; or the electrically conductive, electrochemically inactive carbon material and the electrochemically active cathode material are introduced as composite material and blended with the polytetrafluoroethylene in step (i) in order to obtain the dry, solvent-free composition.

4. The process according to claim 1, wherein the electrically conductive, electrochemically inactive carbon material is selected from carbon black, porous carbons, carbon nanotubes, graphene, graphite, carbon fibres and mixtures thereof.

5. The process according to claim 1, wherein the formation of the at least partially fibrillated polytetrafluoroethylene in step (ii) is carried out by milling, blending in a transport screw or combinations thereof.

6. The process according to claim 1, wherein the forming of the fibrillated composition to give the cathode foil in step (iii) is carried out by rolling, pressing or extrusion.

7. The process according to claim 1, wherein the cathode foil obtained in step (iii) is self-supporting.

8. The process according to claim 2, wherein the introduction of the electrochemically active cathode material into the foil is effected via the melt phase or gas phase.

9. The process according to claim 1, wherein the polytetrafluoroethylene is present in the cathode foil in an amount of from 2% by weight to 50% by weight.

10. The process according to claim 1, wherein the electrochemically active cathode material is sulfur or lithium sulfide (Li$_2$S) or a mixture thereof.

* * * * *